United States Patent
Chi et al.

(10) Patent No.: US 6,738,437 B2
(45) Date of Patent: May 18, 2004

(54) SYMBOL RECOVERY FROM AN OVERSAMPLED HARD-DECISION BINARY STREAM

(75) Inventors: Richard Chi, Santa Clara, CA (US); Ranganathan Krishnan, San Jose, CA (US); Avneesh Agrawal, San Jose, CA (US); Jittra Jootar, Mountain View, CA (US)

(73) Assignee: Qualcomm Incorporated, San Diego, CA (US)

( * ) Notice: Subject to any disclaimer, the term of this patent is extended or adjusted under 35 U.S.C. 154(b) by 286 days.

(21) Appl. No.: 09/871,389

(22) Filed: May 30, 2001

(65) Prior Publication Data

US 2002/0161737 A1 Oct. 31, 2002

Related U.S. Application Data

(60) Provisional application No. 60/276,721, filed on Mar. 15, 2001.

(51) Int. Cl.[7] .............................. H03D 1/00; H04L 7/00
(52) U.S. Cl. ........................................ 375/343; 375/355
(58) Field of Search ................................ 375/343, 350, 375/354, 355, 362, 364, 365, 366, 368

(56) References Cited

U.S. PATENT DOCUMENTS 4,984,249 A    1/1991  Long et al.
5,363,412 A  * 11/1994  Love et al. ............... 375/341
5,818,876 A   10/1998  Love

FOREIGN PATENT DOCUMENTS

EP     0923208     6/1999

OTHER PUBLICATIONS

Bluetooth Specification Version 1.1: (Feb. 22, 2001) pp. 47–51 XP002206504.

* cited by examiner

Primary Examiner—Don N. Vo
(74) Attorney, Agent, or Firm—Philip R. Wadsworth; Charles D. Brown; Timothy F. Loomis

(57) ABSTRACT

A received symbol stream is oversampled and correlated with a known sync word to determine the correlation properties of the oversampled signal with a known sync word. A linear filter, such as a moving average window filter, is convolved with the correlation signal to generate a convolution signal. Once the convolution signal has reached a predetermined threshold, it is scanned over a predetermined window of oversamples. If the convolution signal exceeds the threshold for the window of oversamples, the sync word has been found and the symbol stream is down-sampled at intervals that depend on the data rate of the symbol stream. This down-sampling process may be done by picking the center oversample corresponding to each information symbol given the timing alignment, or by doing a majority vote over a multiple number of samples centered around the center oversample.

22 Claims, 4 Drawing Sheets

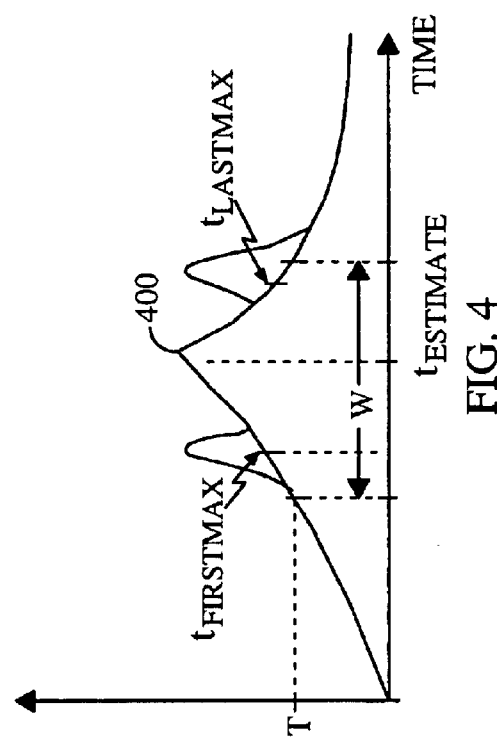

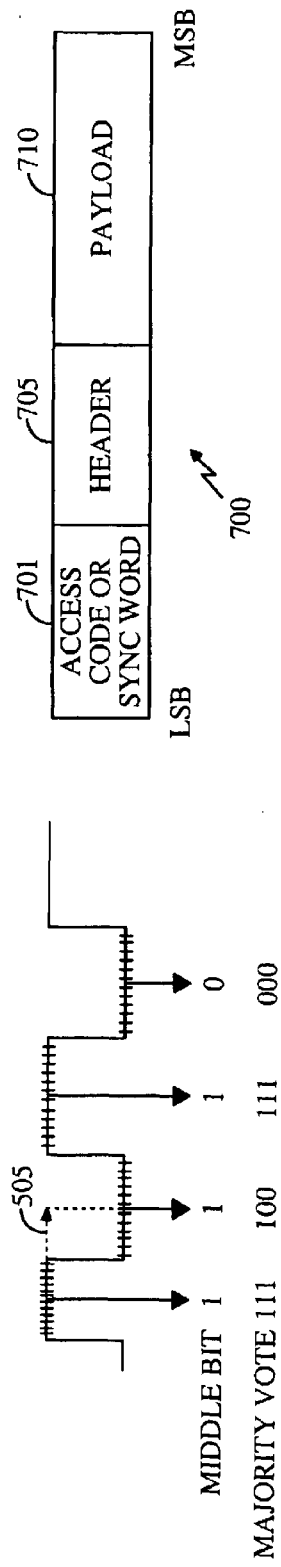
FIG. 5
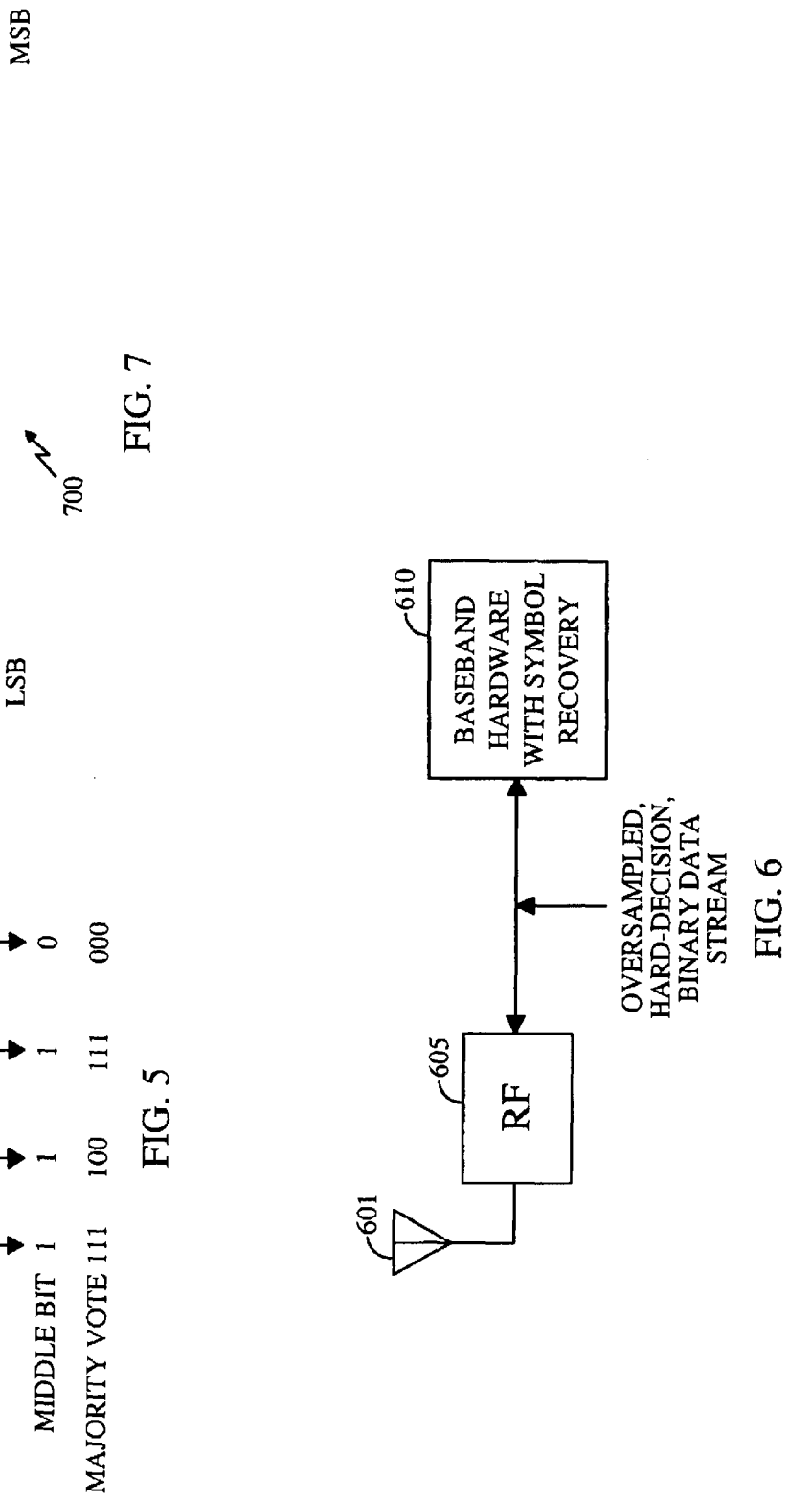
FIG. 7
FIG. 6

US 6,738,437 B2

SYMBOL RECOVERY FROM AN OVERSAMPLED HARD-DECISION BINARY STREAM

CROSS-REFERENCE TO RELATED APPLICATIONS

This application claims the benefit of U.S. Provisional Patent Application Serial No. 60/276,721, filed Mar. 15, 2001.

BACKGROUND OF THE INVENTION

I. Field of the Invention

The present invention relates generally to communications. Particularly, the present invention relates to symbol recovery from a binary data stream.

II. Description of the Related Art

A received signal comprising a symbol stream may not be time aligned with the receiver. In such a case, the receiver needs to know when to sample the received signal in order to accurately recover associated data with lowest probability of error.

Typically, a delay-locked loop is used to identify transitions which occur in the received signal. This enables sampling to occur away from such transitions.

The delay-locked loop is a general-purpose solution to the timing recovery problem that yields moderate performance. However, when the received signal contains some pre-defined sequences of transitions that are known to both transmitter and receiver, one can do better than the general-purpose delay-locked loop by utilizing a priori knowledge of the signal content. In other words, to determine the correct timing alignment, the received message can be correlated against a pre-defined sequence of data known by the receiver to be present in the received message. This technique is referred to as the "sync word correlation" method of timing recovery, where "sync word" denotes the pre-defined sequence of data.

For oversampled received signals, (e.g., 1 Mbps information signal sampled at 12 MHz) there may be many over-samples that correspond to each information symbol. Thus, when the "sync word correlation" method is applied to an oversampled signal, there may be multiple timing alignments where the sync word is detected within the received signal. This is especially so given that hard decisions have already been made on the individual oversamples, prior to the timing recovery.

For minimum probability of error, it is desired to choose the timing alignment that corresponds to the "center" of the information symbol, because this is the maximum eye opening in an eye diagram that is used to depict ISI (inter-symbol interference). Choosing a timing alignment that is not the center of the symbol may result in a higher probability of error, since in general such an alignment is closer to the edge of the symbol, and is more susceptible to noise than the alignment at the center of the symbol. However, the process of identifying which alignment out of the multiple possible timing alignments corresponds to the center alignment is not obvious. Hence, there is a need for a robust and simple way of determining the center timing alignment.

SUMMARY OF THE INVENTION

The present invention encompasses a process for recovering symbols from a binary data stream that is received at a predetermined data rate. The binary data stream is oversampled at a predetermined oversample rate to generate an oversampled signal. In one embodiment, the data rate is 1 MHz and the oversampling rate is 12 MHz. The incoming received oversampled signal is correlated with a pre-defined sequence known to both receiver and transmitter, called the "sync word." The output of the correlation is then convolved with a linear filter such as a moving average window of variable width. The output of the convolution is the convolution signal that is then scanned for a peak. The alignment corresponding to the peak is identified as the "center" of each symbol in the received signal.

BRIEF DESCRIPTION OF THE DRAWINGS

FIG. 2 shows a correlation plot of an oversampled, received signal in accordance with the present invention.

FIG. 3 shows an impulse response of a moving average window to be convolved with the correlation signal of FIG. 2.

FIG. 4 shows a plot of the result of the convolution in accordance with the plots illustrated in FIGS. 2 and 3.

FIG. 5 shows an example of an oversampled sync word in accordance with the majority voting process of the present invention.

FIG. 6 shows a block diagram of the preferred embodiment of the apparatus of the present invention.

FIG. 7 shows a standard packet format of the preferred embodiment of the present invention.

DETAILED DESCRIPTION OF THE PREFERRED EMBODIMENTS

The invention provides a process for time-aligning a receiver with a received signal in order to determine a starting point for sampling the signal. This reduces the probability of error in the recovered signal, thereby increasing the performance of the receiver.

Figure 1:
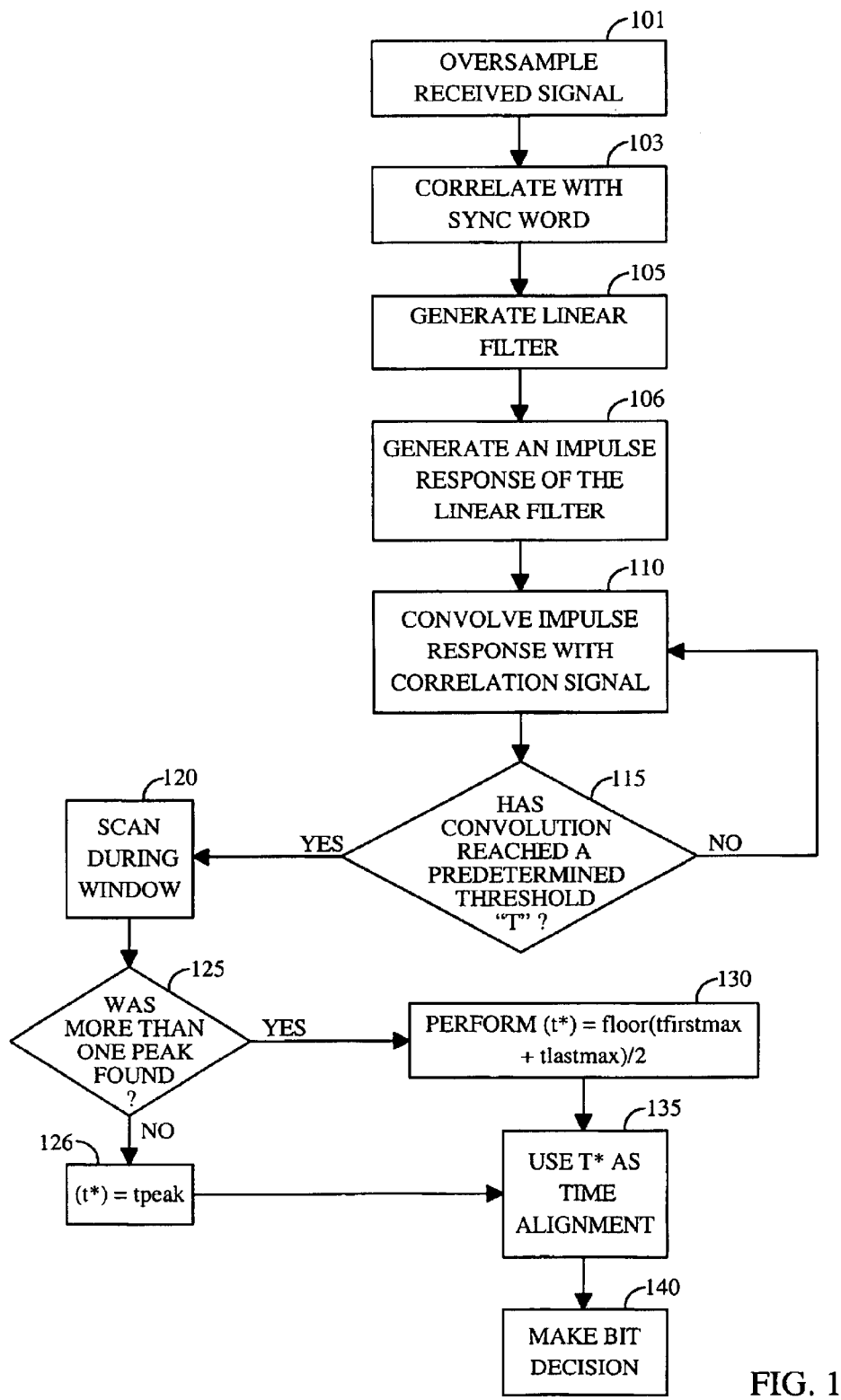
FIG. 1 shows a flowchart of the time alignment process of the present invention.

FIG. 1 illustrates the process in accordance with the invention that is used to detect a synchronizing word and to time-align a receiver with an incoming data stream. The process begins with oversampling the received signal (step 101). In the preferred embodiment, the input signal is a 1 Mbps, hard-decision binary stream.

Hard-decision refers to the fact that the "1" or "0" polarity of the symbols in the incoming stream has already been decided in the previous step (the RF receiver). In a soft-decision binary stream the previous step supplies a multi-level quantized symbol and the decision as to the "1" or "0" polarity of the symbol is only made subsequently.

In an exemplary embodiment, the oversampling is performed at a 12 MHz rate. In other words, the sampling rate is 12 times the input data rate. Alternate embodiments may use other sampling rates. The oversampling rate that is chosen is a trade-off between choosing a rate that is high enough to accurately capture the data but not too high so as to generate too much information that requires a large amount of processing time.

Referring again to FIG. 1, the process next detects the synchronizing (sync) word (step 103) by a correlation process. In one embodiment, the sync word is the 72-bit access code that precedes a data packet that is specified by the Bluetooth standard. Other embodiments use additional synchronizing words or symbols.

In order to detect the sync word (step 103), the received signal is oversampled at the 12 MHz rate. Using a match-filter correlation approach, the oversampled signal goes through the correlation process to generate a correlation signal. In this process, the oversampled signal is compared to the known sync word sequence. When the sequence matches, the correlation signal is highest.

FIG. 2 illustrates the results of the match-filter correlation. The correlation plot of FIG. 2 shows a bit-time of 1 $\mu s$ where the correlation of the received signal is 72 due to the matching of the incoming 72-bit access code with the filter. The values for both the bit-time and the correlation are illustrations of the preferred embodiment. Alternate embodiments have different values.

A linear filter is then generated (step 105). In the preferred embodiment, this linear filter is a moving average window. Alternate embodiments use other forms of linear filters.

An impulse response of the moving average window, illustrated in FIG. 3, is then generated (step 106). The impulse response has an amplitude of one and a length of n where n=12 (i.e., the number of samples in one bit-time). Alternate embodiments use other values for n in the range of 1 up to the oversample rate, which in the exemplary embodiment is twelve (12).

The impulse response of FIG. 3 is convolved with the oversampled signal of FIG. 2 to generate the convolution signal illustrated in FIG. 4 (step 110). By convolving with a moving average window, an attempt is made to obtain a single peak from the possible multi-peak output of the matched-filter correlation in FIG. 2. ("single" and "multi" here refer to number of oversamples). The term "peak" refers to a local maximum of the signal value.

The presence of only one peak of the signal in FIG. 4, as opposed to twelve peaks in the signal of FIG. 2, shows that the goal of attaining only one peak has been accomplished through convolution with a moving average window. The fact that the magnitude of the peak also exceeds some threshold T shows that the access code or sync word has been received correctly. The peak also shows that point in time from which the subsequent stream of data can be sampled. In one embodiment, this sampling occurs every 1 $\mu s$. Alternate embodiments with different data rates use different sampling rates.

In a noisy environment, even the convolution signal illustrated in FIG. 4 may have multiple peaks (i.e., local maxima). Therefore, it is important to determine the proper alignment between the oversampled stream and the sync word in order to start the time for subsequent sampling. This is accomplished by averaging the time alignments corresponding to the "global maxima" of the convolution over the entire searcher window.

Referring again to the process of FIG. 1, when the convolution, illustrated in FIG. 4, reaches a predetermined threshold (step 115), the searcher window begins. In the present description, the threshold is illustrated as T.

The choice of threshold used to determine the searcher window is a trade-off between minimizing the probability of false alarms while ensuring that the searcher window is wide enough to pick the global peak. Because the minimum distance between valid sync words (dmin) is specified in the Bluetooth standard as 14, the threshold is set at 64−(dmin/2)=57 to avoid false alarms, while allowing for bit errors in the received sync word. The choice of 57 assumes that there are a negligible number of possible sync words with off-center autocorrelation values greater than 57.

The threshold determination described above is only one method possible for determining the threshold. Alternate embodiments use other thresholds as well as other methods for determining the threshold.

The searcher window ends w oversamples later. The choice for w is also a design parameter that is a trade-off between minimizing delay (smaller w) and ensuring a global peak (larger w). In the preferred embodiment, w is the time duration of two information symbols.

If the correlation has reached the threshold T, the searcher begins to scan during the window w for the correlation peak (step 120). The searcher is well known in the art and is not discussed further.

If more than one peak was found (step 125) during the correlation process, an averaging operation is performed to determine the time alignment. Referring again to FIG. 4, $t_{estimate}$ (also referred to as t*) is determined in a multiple peak environment by the following:

$$t_{estimate} = floor(t_{first\ max} + t_{last\ max})/2.$$

In this equation, $t_{firstmax}$ is the first maximum peak scanned after the threshold is reached and $t_{lastmax}$ is the last maximum peak that was scanned after the threshold is reached. By dividing the floor function of the sum of these two peaks, the average peak is generated.

If more than one peak was not found (step 125), the one peak itself is directly used as the time alignment peak. In this case, t*=tpeak (step 126). Once the estimate for the peak time is generated, either through the average of the floor function (step 130) or the single peak (step 126), t* is set as the time for alignment purposes (step 135).

As discussed above, all subsequent sampling is performed a predetermined time (i.e., every 1 $\mu s$ in the preferred embodiment) after the estimated peak time, t*. Alternate embodiments use other sampling times.

Even though an estimate of the correct time alignment has been made, the actual decision of the polarity of the entire symbol (not just the oversamples, whose polarity the hard-decision process has already decided) must still be determined (step 140). One embodiment for making a bit decision on the symbol is to use the middle sample of the twelve oversamples. This would mean using either oversample number 6 or 7 if the oversampling rate is 12. This keeps the sampling and any subsequent sampling away from the transitions of the signal.

Another embodiment of a process for performing a bit decision (step 140) is to take a majority vote over some subset m of the twelve oversamples. In this embodiment, m is odd and less than twelve. Alternate embodiments use other ranges for m since alternate embodiments use other oversampling rates than 12×. For example, if the oversampling rate was 20×, m might be less than twenty.

A desired value for m depends on the characteristics of the received signal. These characteristics include the RF processing that has been applied to it as well as the signal modulation at the transmitter. In the preferred embodiment, the majority vote is performed with m=3. Alternate embodiments use other values for m.

FIG. 5 illustrates an example of a signal for a sync word or access code. In one embodiment, this signal illustrates a portion of a 72-bit access word. This signal has a jitter in the first bit (505) that causes the first bit to overlap the second bit at times. Using the middle bit decision process would cause the first four bits of the access code to be chosen as 1110 when the second bit is actually a logical 0.

A (3 out of 12) majority vote process picks the middle sample of the twelve oversamples (as determined from the sync word correlation described earlier), and also looks at the oversample on either side of the middle oversample. Then a majority vote is performed on the three oversamples. As illustrated in FIG. 5, a majority of the oversamples from the second bit correctly indicate that that bit is a 0.

FIG. 6 illustrates one embodiment in block diagrammatic form of a symbol recovery system in accordance with the present invention. More specifically, the illustrative embodiment incorporates a symbol recovery mechanism configured in accordance with Bluetooth compliant hardware.

The symbol recovery mechanism shown is comprised of a 2.4 GHz Bluetooth radio frequency block (605) that operates at 1 mW. The Bluetooth radio uses a Time-Division Duplex scheme with binary frequency modulation. The radio (605) is coupled to an antenna (601) for transmitting and receiving the signals.

A baseband block (610) is responsible for the baseband protocols of the unit. This baseband block (610) incorporates the symbol recovery process of the previously disclosed embodiment. The RF block (605) recovers and sends the baseband block (610) the oversampled, hard-decision, binary symbol stream for time alignment and recovery.

The Bluetooth system communicates using packets of data. An example of such a packet (700) is illustrated in FIG. 7. This packet is comprised of the access code or sync word (701), the header (705), and the payload (710).

The access code (701) is the sync word with which the symbol recovery process described herein synchronizes the receiver. In one embodiment, the access code (701) is 72 bits in length, the header (705) is 54 bits in length, and the payload of information (710) is in the range of zero to 2745 bits in length. Different packet types are defined by Bluetooth and, therefore, have different payload lengths.

The Bluetooth system can be incorporated in a mobile station such as a cellular telephone or other electronic device to enable short-range communication with the mobile station. For example, a headset incorporating the Bluetooth system can be coupled in a wireless fashion with the mobile.

Figure 8:
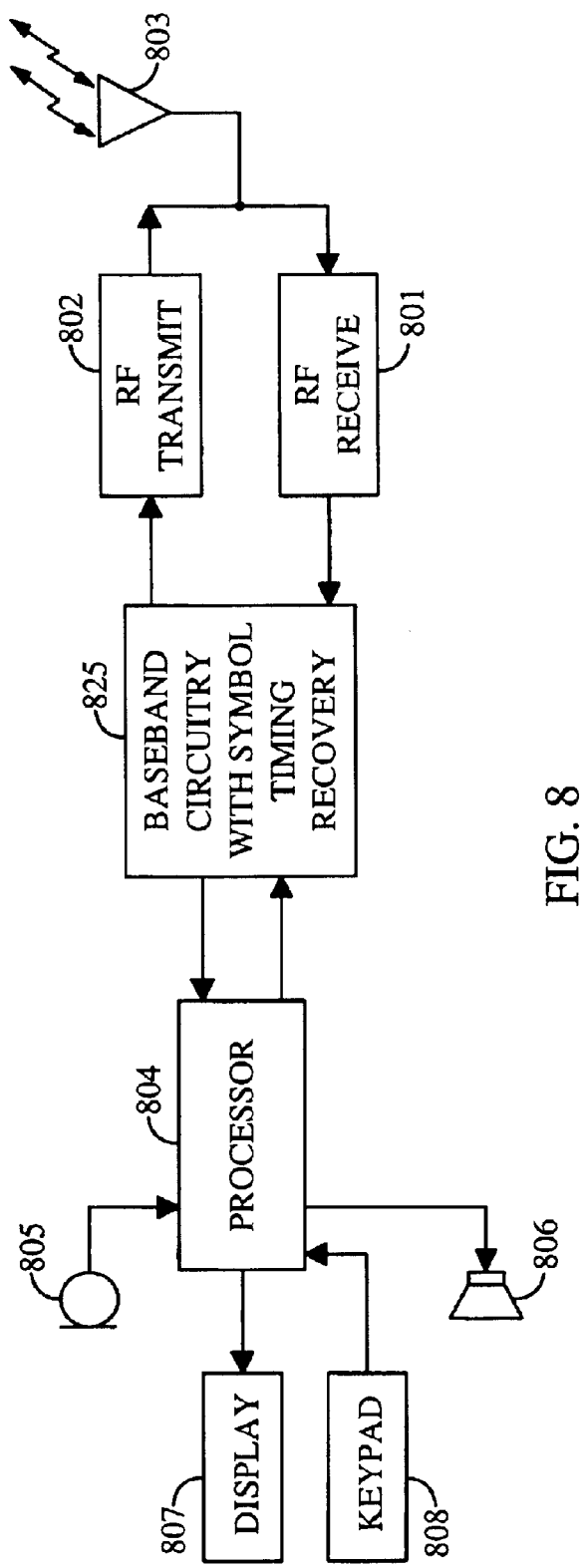
FIG. 8 shows a block diagram of a mobile station incorporating the symbol recovery mechanism of the present invention.

FIG. 8 illustrates a block diagram of a mobile station with the Bluetooth system incorporating the symbol recovery mechanism of the invention. This block diagram is only one such example of a mobile station.

The mobile station is comprised of an RF transmitter (802) and receiver (801) that are coupled to an antenna (803). The RF transmitter modulates the digital signals from the baseband circuitry (825) for transmission. The antenna (803) then radiates the signal over a channel to the intended destination.

The RF receiver (801) is responsible for receiving and demodulating signals received over the antenna (803). In some communication devices, the receiver may be responsible for converting received digital signals into their analog equivalent for radiation by a speaker or earpiece (806).

In a Bluetooth or CDMA environment, the signals from the microphone (805) undergo baseband packet processing by the baseband circuitry (825) to put them into the format illustrated in FIG. 7. Similarly, the signals from the RF receiver (801) undergo baseband circuitry (825) processing to return them to a state useable by the speaker or earpiece (806).

A processor (804) such as a microprocessor or other controlling device controls the mobile station. The processor (804) is coupled to and controls the RF transmitter (802) and RF receiver (801) functions.

A display (807) and keypad (808) are coupled to the processor (804). The display (807), such as a liquid crystal display (LCD), presents information entered by a user on the keypad (808). For example, the user may enter a telephone number using the keypad (808) that is displayed on the display (807) and subsequently transmitted to a base station using the RF transmitter (802).

The baseband circuitry (825) incorporating the symbol timing recovery mechanism of the present invention receives the oversampled, binary, hard-decision symbol stream from the RF transmitter block (820) and converts the stream to a data signal that is used by the processor (804) for display or radiation by the speaker or earpiece (806). Similarly, the baseband circuitry (825) incorporating the symbol timing recovery mechanism of the present invention transmits a baseband signal to the RF transmitter (802) for processing.

While the symbol stream recovery process of the present invention is illustrated as being used in a cellular telephone, the disclosed embodiments can be used in any device having a received signal having good autocorrelation properties. Such a device can be a personal digital assistant having wireless communication capabilities.

In summary, the symbol stream recovery process of the present invention provides a more accurate symbol recovery mechanism for hard decision binary stream of symbols. The present invention detects a sync word and provides time alignment using an n-out-of-12 correlation of a 12× oversampled input stream, where n represents the number of middle oversamples in each symbol of the reference sync word.

It should be noted that in all the embodiments described above, method steps can be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal.

In the alternative, the processor and the storage medium may reside as discrete components in a user terminal. The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of recovering symbols from a binary data stream having a data rate, the method comprising:
    oversampling the binary data stream at a predetermined oversample rate to generate an oversampled signal;
    correlating the oversampled binary data stream with a known sync word to create a correlation output;
    convolving the correlation output with an impulse response of a linear filter to generate a convolution signal;
    searching for a peak in the convolution signal during a searcher window, the searcher window beginning once the convolution output reaches a threshold; and
    identifying a timing alignment of a sync word, wherein if a single peak in the convolution signal is found during the searcher window, the single peak is used to identify the timing alignment and if a plurality of peaks in the convolution signal are found during the searcher window, a time between a first maximum peak of the plurality of peaks and a last maximum peak of the plurality of peaks is averaged to identify the timing alignment.

2. The method of claim 1, wherein the predetermined oversample rate is twelve times the data rate.

3. The method of claim 1, further comprising the step of aligning subsequent symbol recovery in response to the sync word.

4. The method of claim 1, wherein the linear filter is a moving average window.

5. In a baseband portion of a receiver having a radio frequency portion, a method of recovering symbols from a binary data stream having a predetermined data rate, the method comprising:
    oversampling the binary data stream at a predetermined oversample rate to generate an oversampled signal;
    correlating the oversampled binary data stream with a known sync word to generate a correlation signal;
    constructing a moving average window;
    convolving the moving average window with the correlation signal to generate a convolution signal;
    searching for a peak in the convolution signal during a searcher window, the searcher window beginning once the convolution output reaches a threshold;
    identifying the timing alignment of a sync word within the convolution signal, wherein if a single peak in the convolution signal is found during the searcher window, the single peak is used to identify the timing alignment and if a plurality of peaks in the convolution signal are found during the searcher window, a time between a first maximum peak of the plurality of peaks and a last maximum peak of the plurality of peaks is averaged to identify the timing alignment; and
    synchronizing the receiver to the binary data stream in response to the sync word wherein the binary data stream is sampled at predetermined times after the sync word.

6. The method of claim 5, wherein the sync word is an access code that is compliant with Bluetooth protocols.

7. The method of claim 5, wherein the data stream is organized into packets of data that are compliant with Bluetooth protocols.

8. The method of claim 5, further including performing a bit decision process on the oversampled signal in order to determine polarity of a symbol.

9. The method of claim 8, wherein the bit decision process comprises a majority vote on a plurality of oversamples of the oversampled signal.

10. A Bluetooth compliant receiver having a baseband portion that receives a binary data stream that is organized into Bluetooth compliant packets comprising an access code, the receiver comprising:
    means for oversampling the binary data stream at a predetermined oversample rate to generate an oversampled signal;
    means for correlating the oversampled binary data stream with a known sync word to generate a correlation signal;
    means for convolving an impulse response of a linear filter with the correlation signal to generate a convolution signal;
    means for identifying timing alignment of the access code by identifying a maximum value of the convolution signal, wherein the means for identifying timing alignment searches for a peak in the convolution signal during a searcher window, the searcher window beginning once the convolution output reaches a threshold and if a single peak in the convolution signal is found during the searcher window, uses the single peak to identify the timing alignment and if a plurality of peaks in the convolution signal are found during the searcher window, averages a time between a first maximum peak of the plurality of peaks and a last maximum peak of the plurality of peaks to identify the timing alignment; and means for synchronizing the receiver to the oversampled signal in response to the access code wherein the oversampled signal is sampled at predetermined times after the sync word.

11. In a mobile station apparatus having communications capability, the apparatus having a receiver that is Bluetooth compliant and comprising a baseband portion that receives a binary data stream that is organized into Bluetooth compliant packets comprising an access code, the receiver comprising:

means for oversampling the binary data stream at a predetermined oversample rate to generate an oversampled signal;

means for correlating the oversampled binary data stream with a known sync word to generate a correlation signal;

means for convolving the an impulse response of a linear filter with the correlation signal to generate a convolution signal;

means for identifying timing alignment of the access code by identifying a peak in the convolution signal, wherein the means for identifying timing alignment searches for a peak in the convolution signal during a searcher window, the searcher window beginning once the convolution output reaches a threshold and if a signal peak in the convolution signal is found during the searcher window, uses the single peak to identify the timing alignment and if a plurality of peaks in the convolution signal are found during the searcher window, averages a time between a first maximum peak of the plurality of peaks and a last maximum peak of the plurality of peaks to identify the timing alignment;

means for identifying the access code in response to the timing alignment; and means for synchronizing the receiver to the oversampled signal in response to the access code wherein the oversampled signal is sampled at predetermined times after the sync word.

12. The apparatus of claim 11 wherein the mobile station is a cellular telephone having Bluetooth protocol compatible capabilities.

13. The apparatus of claim 11 wherein the mobile station is a personal digital assistant with wireless communication capabilities and Bluetooth protocol compatible capabilities.

14. A method of recovering symbols from a binary data stream having a predetermined data rate, the method comprising:

oversampling the binary data stream at a predetermined oversample rate to generate an oversampled signal;

correlating the oversampled binary data stream with a known sync word to generate a correlation signal:

constructing a moving average window;

generating an impulse response for the moving average window;

convolving the impulse response with the correlation signal to generate a convolution signal;

searching for a peak in the convolution signal during a searcher window, the searcher window beginning once the convolution output reaches a threshold;

identifying a timing alignment of a sync word, wherein if a single peak in the convolution signal is found during the searcher window, the single peak is used to identify the timing alignment and if a plurality of peaks in the convolution signal are found during the searcher window, a time between a first maximum peak of the plurality of peaks and a last maximum peak of the plurality of peaks is averaged to identify the timing alignment identifying the sync word in response to the timing alignment;

synchronizing the receiver to the binary data stream in response to the sync word; and sampling the oversampled signal at predetermined times after the sync word.

15. The method of claim 14, further including the step of performing a majority vote on a plurality of oversamples of the oversampled signal in order to determine a proper bit state.

16. The method of claim 14, further including when the correlation signal reaches a predetermined threshold, scanning the oversampled signal for the sync word.

17. The method of claim 16, wherein the step of scanning further comprises scanning over a predetermined window of time after the predetermined threshold has been reached.

18. The method of claim 14, wherein a peak of the correlation signal time-aligns the binary data stream with a receiver.

19. In a mobile station apparatus, the apparatus having a receiver and comprising a baseband portion that receives an oversampled, binary data stream that is organized into data packets, each data packet comprising a sync word, the receiver comprising:

means for correlating the oversampled binary data stream with a known sync word to generate a correlation signal;

means for constructing a moving average window;

means for convolving the moving average window with the correlation signal to generate a convolution signal;

means for identifying timing alignment of the access code by identifying a peak in the convolution signal, wherein the means for identifying timing alignment searches for a peak in the convolution signal during a searcher window, the searcher window beginning once the convolution output reaches a threshold and if a single peak in the convolution signal is found during the searcher window, uses the single peak to identify the timing alignment and if a plurality of peaks in the convolution signal are found during the searcher window, averages a time between a first maximum peak of the plurality of peaks and a last maximum peak of the plurality of peaks to identify the timing alignment;

means for identifying the sync word in response to the timing alignment; and means for synchronizing the receiver to the oversampled, binary data stream in response to the access code wherein the oversampled, binary data stream is sampled at predetermined times after the sync word.

20. A method of recovering symbols from a binary data stream having a data rate, the method comprising:

oversampling the binary data stream at a predetermined oversample rate to generate an oversampled signal;

correlating the oversampled binary data stream with a known sync word to create a correlation output;

constructing a moving average window;

convolving the moving average window with the correlation output to generate a convolution signal;

searching for a peak in the convolution signal during a searcher window, the searcher window beginning once the convolution output reaches a threshold; and identifying a timing alignment of a sync word, wherein if a single peak in the convolution signal is found during the searcher window, the single peak is used to identify the timing alignment and if a plurality of peaks in the convolution signal are found during the searcher window, a time between a first maximum peak of the plurality of peaks and a last maximum peak of the plurality of peaks is averaged to identify the timing alignment.

21. A method of recovering symbols from an incoming, oversampled, hard-decision binary stream, comprising:

identifying best alignment information between an a priori known sync word and oversamples of symbols in the binary stream; and downsampling remaining symbols using majority vote of each symbol's associated oversamples as determined from the best alignment information.

22. The method of claim 21, wherein the binary stream comprises a packet constructed in accordance with Bluetooth.

* * * * *